Sept. 21, 1954

W. N. MATHEWS 2,689,433

GLASS MELTING TANK

Filed May 12, 1952

INVENTOR
William N. Mathews
by: Green, McCallister and Miller
his Attorneys

INVENTOR
William N. Mathews
by Green, McCallister and Miller
his Attorneys

Sept. 21, 1954   W. N. MATHEWS   2,689,433
GLASS MELTING TANK
Filed May 12, 1952   5 Sheets-Sheet 4
Fig. 5
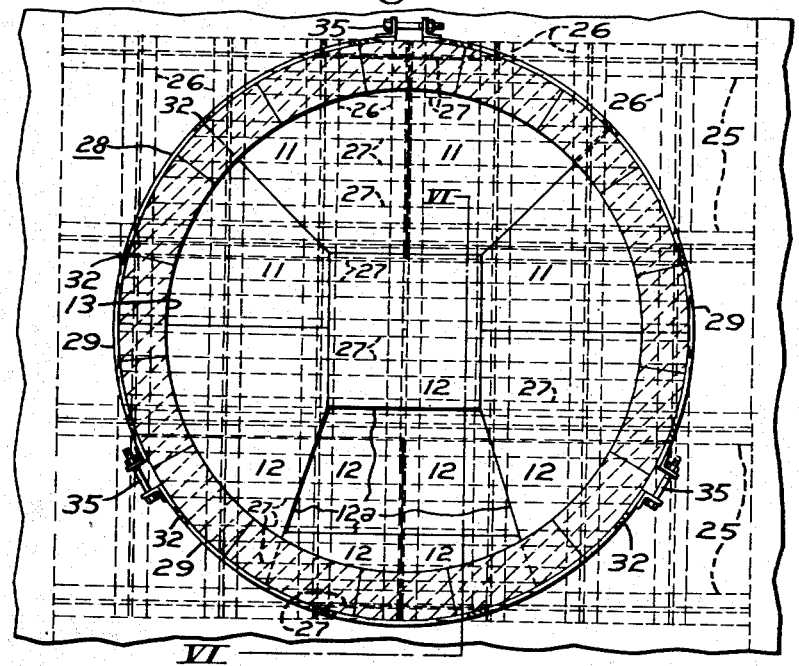
Fig. 6
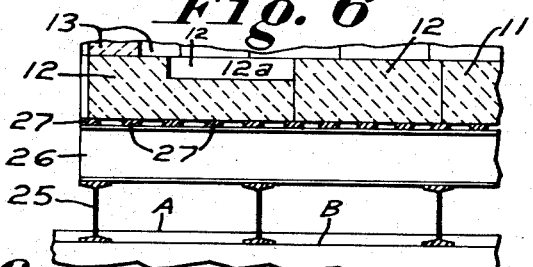
Fig. 16   Fig. 17   Fig. 19
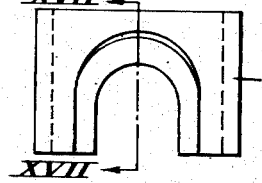 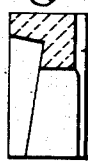 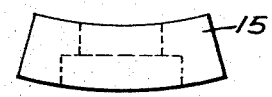 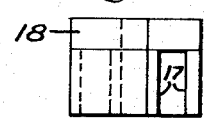
Fig. 18
Fig. 20
Fig. 21   Fig. 22   Fig. 15
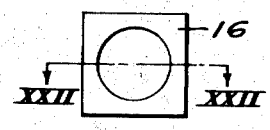 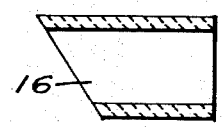 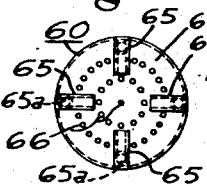
INVENTOR
William N. Mathews
by:
Green, McCallister and Miller
his Attorneys Sept. 21, 1954  W. N. MATHEWS  2,689,433
GLASS MELTING TANK
Filed May 12, 1952  5 Sheets-Sheet 5

INVENTOR
William N. Mathews
by:
Green, McAllister, and Miller
his Attorneys

Patented Sept. 21, 1954

2,689,433

UNITED STATES PATENT OFFICE 2,689,433

GLASS MELTING TANK

William N. Mathews, Monaca, Pa., assignor to
The Phoenix Glass Company, a corporation of
West Virginia Application May 12, 1952, Serial No. 287,280

6 Claims. (Cl. 49—54)

This invention relates to a new and improved glass melting tank construction and particularly, to a round tank suitable for so-called "day" usage.

The present day practice in the art has been to utilize rectangular tanks in the gas melting of glass batches. There has been a definite need in the art for a better and more efficient type of tank which will be more economical as to its gas consumption. In a rectangular tank, the gas consumption is fairly proportional to its size and capacity. It has been customary to provide a tank size which will be most efficient for a particular melting utilization and which will melt the glass in sufficient time for the working operations. Even so, difficulty has been experienced in melting the glass in a rectangular tank so that it may be ready for working, for example, at seven o'clock in the morning and it frequently occurs that the starting time was delayed because the tank batch was not ready. It has been determined that a larger day tank only aggravates the condition further. The average melting time for the rectangular tank employing gas burners where the air was controlled automatically by the amount of gas permitted to enter the furnace through the burners, was from twelve to sixteen hours. Defects from the use of rectangular tanks have also occurred in the form of streaks, cords and stones in the glass.

In a rectangular day tank, the path of the flame is directly across its longitudinal inside dimension. If the tank is, for example, 100" long by 50" wide, the flame will travel 100" before it reaches the outlet to the stack. When the tank is filled with a cold batch which of course occupies a much greater volume than the melted glass, it has been necessary to pile the batch 12 to 15 inches higher in the center of the tank than the working level of the glass. This piled-up batch not only reduces the combustion area, but tends to deflect the flame so that it crosses the tank above the glass batch towards its crown. The batch being initially cold, chills the gas and air mixture that is attempting to burn, so that its immediate combustion is retarded. Further, instead of combustion being completed in the tank, a considerable percentage of the gas-air mixture is not able to burn until it reaches the stack. As the cold batch heats up and begins to melt, thus increasing combustion area in the furnace, full combustion may substantially take place. However, it requires approximately two hours after starting a melt before the batch becomes sufficiently hot and melted to permit any efficiency of combustion within the furnace.

In such a rectangular tank, the outlet to the stack is in the center of a back vertical wall and there is thus no streamline approach of the gases about the glass batch to the stack outlet. A great percentage of the gases, including those burning, impinge against this back wall and rebound, building up a high internal pressure in the tank. Such internal pressure causes the burning gases to seek an exit not only through the stack, but through any other small opening that may exist, especially in the crown where it abuts the straight wall at the stack end, as well as at any joints between the refractory materials, and at the clayed-up working holes. It will, of course, be noted that the working holes are closed during the heating-up operation. The burning gases thus forced through these crevices, produce heat and friction at localized points or areas, and a resultant wearing away of the refractories. Frequently small pieces of worn refractories fall into the melted glass, causing what are termed stones. The resultant life of the crown and other parts of the furnace is thus materially shortened.

It will also be apparent that in the course of melting and working in a rectangular tank, the burning gases move above the glass in one direction, namely straight across the longitudinal dimension of the tank, from the burner opening or openings to the stack opening. Friction between the burning gases and the surface of the gas tends to cause melted glass to move towards the stack end of the tank. However, the direction thus induced to the molten glass which drives it against the back vertical wall, in itself, limits the movement of glass due to friction, since the glass tends to dam up before the vertical wall at the stack end of the tank.

Heretofore, during working periods, it has been difficult to keep the (normally two) work openings at a neutral condition or pressure with respect to the outside atmosphere. One working hole will often exhibit a positive pressure with flame stingout, while on the other hand, the opening nearest the stack may have less than an atmosphere pressure, thus causing cool air to enter the furnace and chill the glass at such point. It has thus been practically impossible to maintain the glass at the two working holes at the same temperature. Often, the glass inside the work hole nearer the stack becomes sandy on its surface due to the extra cooling, while the glass near the work hole further from the stack is relatively free from sand or devitrification.

Thus, under present day conditions, the efficiency of fuel utilization is relatively low and there is no definite assurance that the glass will be ready to work at a scheduled time from the initial start of the melting-down operation. Difficulty is also encountered due to the lack of homogeneity of the glass and due to streaks, cords and stones therein. Also, it will be apparent that the flux blocks, themselves, have a relatively short life, since certain sections are hotter than others during the melting operation. That is, there is greater wear and corrosion of the blocks at the hotter sections. It has been definitely demonstrated by building a tank with a partition block in the center to separate it into two halves, that the end towards the burner of a rectangular tank is never as warm as the end towards the stack, and that the glass towards the stack melts much quicker than the glass towards the burner.

Another disadvantage of the present day tanks is the cost of their construction, since buckstays and expansion bolts have been found necessary to prevent binding and cracking of the blocks, particularly during the heating-up operation. It is, of course, important to avoid cracking the blocks, in that every crack provides an additional joint at which active corrosion takes place between the melting glass and the refractories, with the resultant danger of particles of the refractories wearing or breaking off and floating in the glass body to form stones.

From the above, it will be seen that there is a critical need for a much more efficient type of glass melting tank, which will have an increased period of effective life, which will make more efficient use of heating gas and which will produce better melted glass for working within a minimum and accurate period of time.

It has thus been an object of my invention to devise a new and improved tank structure which will meet the problem presented.

Another object has been to devise a system or arrangement for melting down a glass batch and for holding it at a working temperature, which will have a much greater efficiency, will produce a better and more homogeneous body of melted glass, and which will eliminate the limiting factors of present day types of tanks such as above described.

Another object of my invention has been to provide a glass melting tank which will provide a maximum effectiveness of melting down action with a minimum of wear and tear on its walls and crown and which will further insure a substantially complete combustion of the air and gas mixture therein.

A further object has been to provide an improved tank construction within which positive and negative air pressures may be controlled during working time.

These and many other objects of my invention will appear to those skilled in the art from the following description thereof.

In the drawings,

Figure 5 is a horizontal section taken along the line V—V of Figure 1;

Figure 6 is a fragmental sectional view in elevation taken along the line VI—VI of Figure 5 and showing a ladle well and how a floor of the tank is supported;

Figure 1:
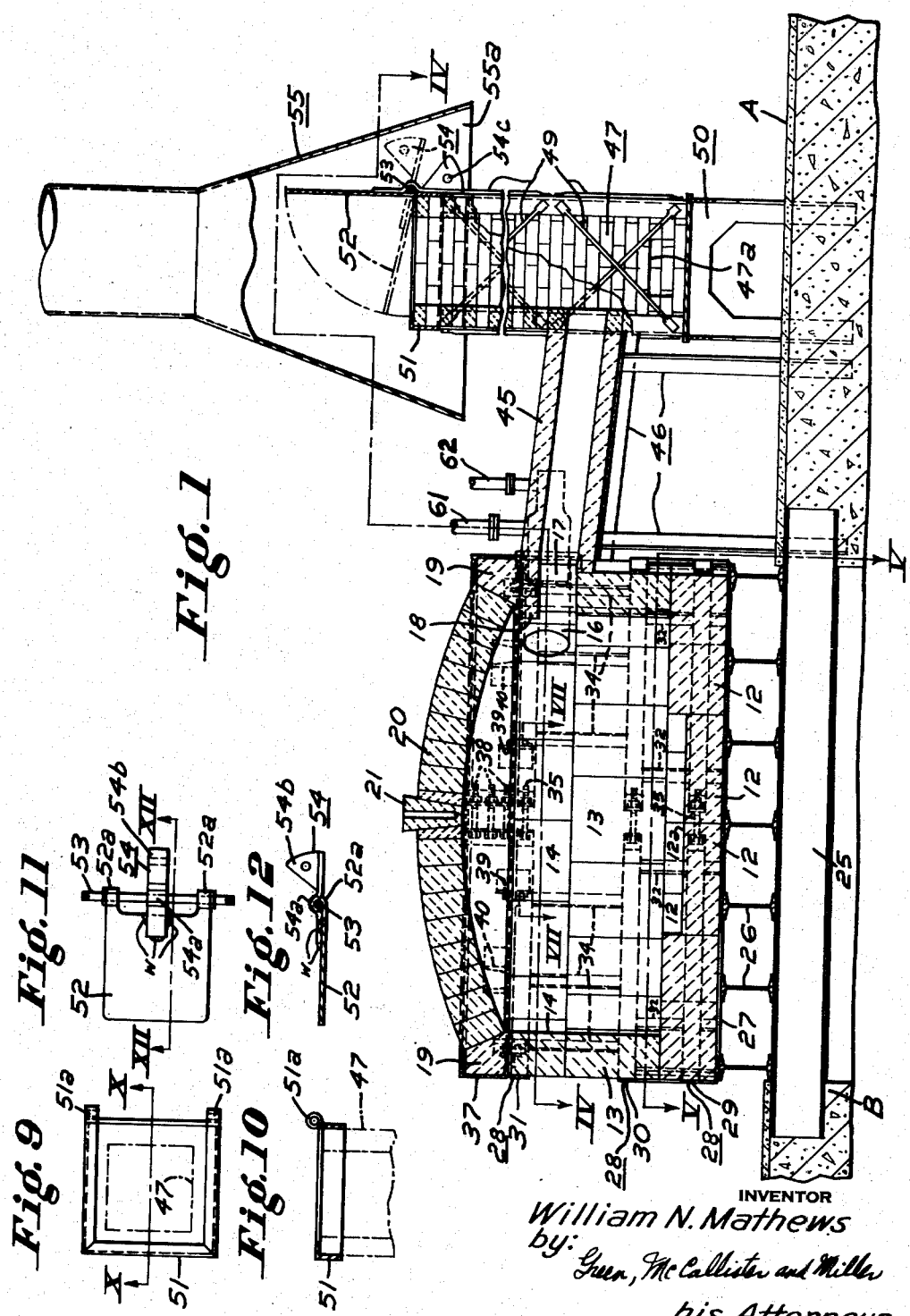
Figure 1 is a transverse section in elevation showing a system or tank and stack constructed in accordance with my invention and as taken along line I—I of Figure 4.
Figure 2:
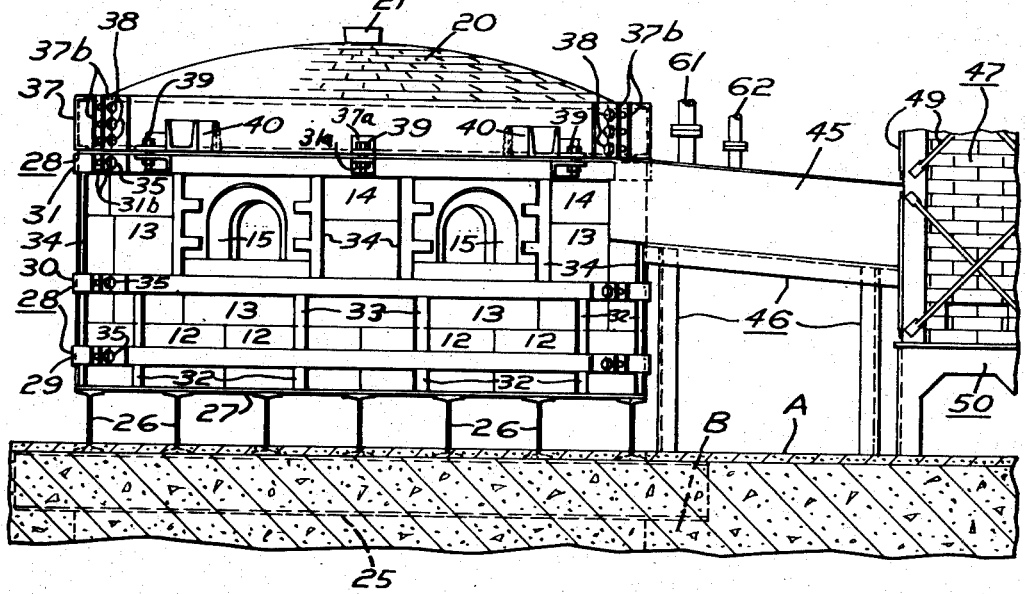
Figure 2 is a front view in elevation showing the outside construction of the tank of Figure 1 and its supporting cake framework.
Figure 4:
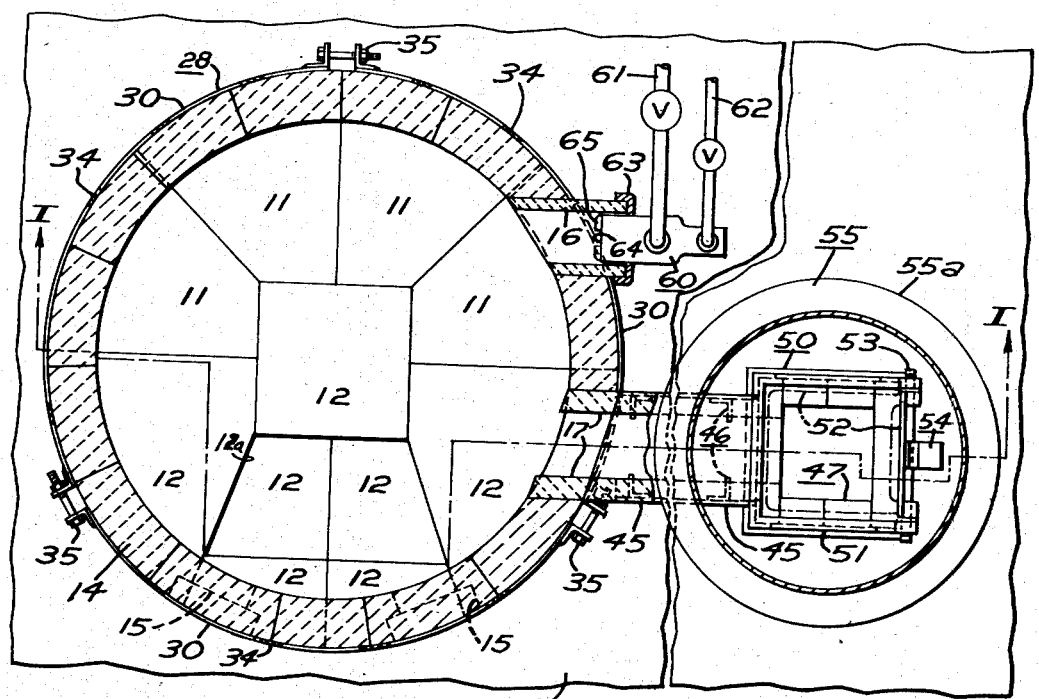
Figure 4 is a horizontal section, partially broken away, and taken along the line IV—IV of Figure 1.
Figure 7:
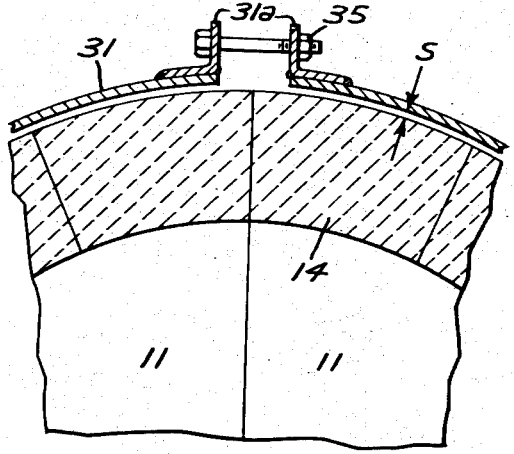
Figure 8:
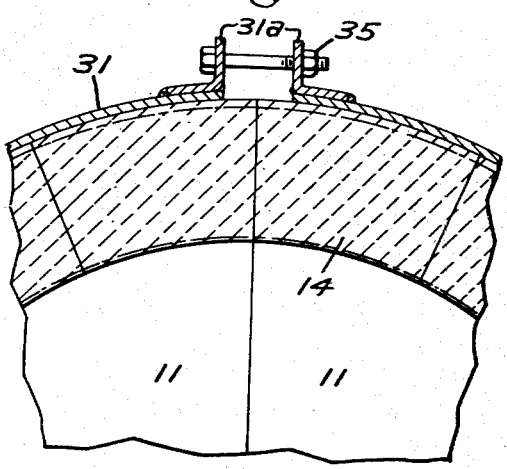
Figure 13:
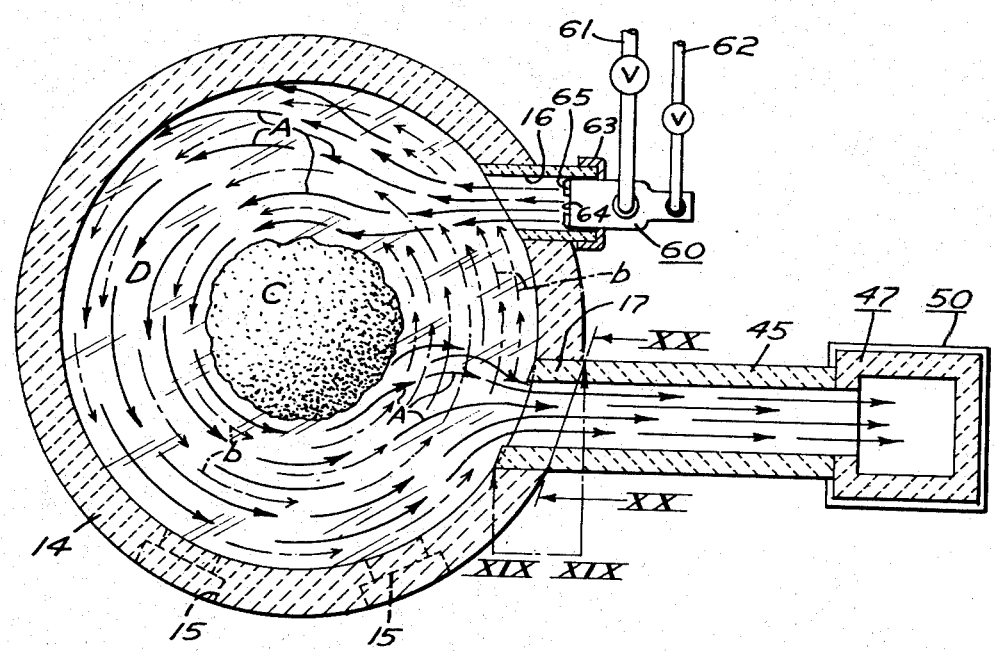
Figure 14:
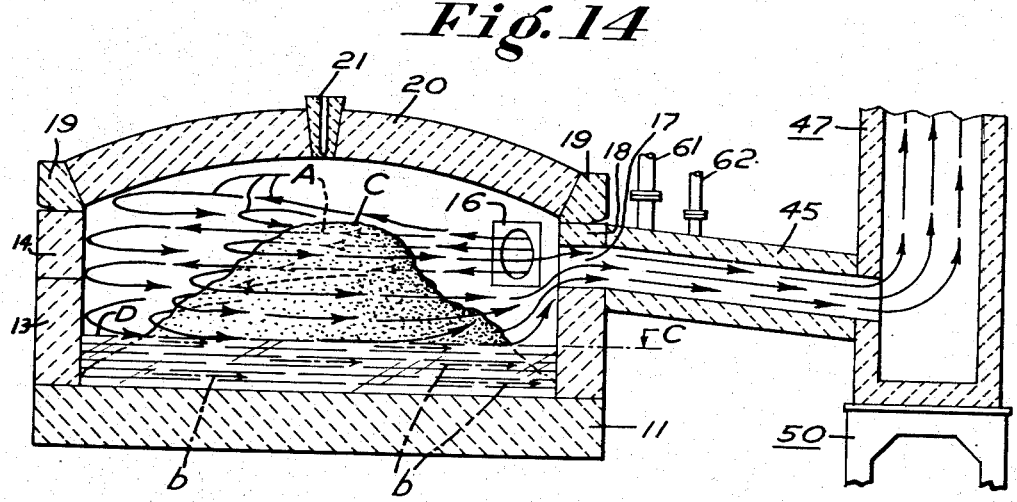

Figures 7 and 8 are greatly enlarged horizontal fragmental sections taken on the line VII—VII of Figure 1 and illustrating how expansion is permitted in wall blocks of the tank; in this connection, Figure 7 shows a somewhat loose or spaced relationship between a metal band of the cage structure and a pair of furnace blocks when the furnace is cool and Figure 8 illustrates an expanded relationship of the blocks when the tank is heated up;

Figure 9 is a horizontal detail view taken across a top framing of a flue stack with a damper shown in Figures 1 and 4 removed;

Figure 10 is a fragmental section in elevation taken along the line X—X of Figure 9;

Figure 11 is a horizontal detail view showing the stack damper of Figures 1 and 4;

Figure 12 is a detail section in elevation taken along the line XII—XII of Figure 11;

Figure 13 is a horizontal and Figure 14 is a vertical sectional diagram (essentially diagrammatic figures not taken on any particular line of other figures) across a tank of my invention illustrating how glass is melted down therein; these views diagrammatically illustrate by full line arrows the flow path of burning combustion gases and by dotted arrow lines, the flow path or induced movement of melted glass about a centrally positioned batch or charge of solidified glass during the melting down operation;

Figure 15 is an enlarged front end view of a burner shown in Figure 13;

Figure 16 is a front view in elevation showing the construction of work hole blocks of the tank of Figure 2;

Figure 17 is a cross-section in elevation taken along the line XVII—XVII of Figure 16;

Figure 18 is a top plan view of Figure 16;

Figure 19 is a vertical elevation showing a flue block on a line of vision XIX—XIX of Figure 13;

Figure 20 is an end elevation of the flue block of Figure 19, taken in the direction of line XX—XX of Figure 13.

Fig. 21 is an end elevation of the burner block.

Fig. 22 is a cross-section taken along the line XXII—XXII of Fig. 21.

There have been many attempts to solve the problem involved in connection with the melting down of glass batches, for example, one investigator attempted to utilize a round melting tank by applying two cross-directed and spaced-apart side flame jets from one side sector in opposition to a similar and opposed set on an opposite side sector of the furnace. A flue was connected to an intermediate sector or segment located between the two opposed cross jets and melted glass was to be removed from a side sector segment that was directly opposite to the flue connection. This method was found even more unsatisfactory than the standardized rectangular tank procedure in that the opposed cross-jets would impinge against the centrally-positioned solidified glass and over it against each other to build up a relatively high pressure in the tank and a central bulge of flame which turned backwardly towards the flue connection. Among other things, this method resulted in greater damage to the crown or roof of the furnace, was wasteful of gas, resulted in an even lesser completion of combustion within the tank or furnace and left corner sectors within the tank where the melted glass tended to freeze because of the type of movement of the flame. Further, the glass at the removal end of the furnace was relatively colder and tended to freeze Another investigator in attempting to use a round furnace applied a series of gas jets tangentially around the inside of the furnace and then removed the gases through a central opening in a flat roof. This method produced a spiral-upward type of movement of the burning gases such that the flame was concentrated at the top flue connection of the roof. As a result, the roof became greatly overheated and did not last for any length of time. The warmest portions of the flame tended to concentrate at the top of the furnace rather than at the top surface of the glass where they were needed and the swirling action produced such a pressure build-up that the flue opening had to be definitely restricted to provide any reasonable measure of combustion within the tank. Such restriction, itself, further increased the pressure buildup. As a result, this type of furnace could not be used where the melted glass was to be removed from work holes. It was then thus necessary to feed the melted glass downwardly from a central part of the bottom of the tank and even in such case, difficulty was encountered in controlling the downflow of glass due to the inner pressure.

As a result of such ineffectual attempts to utilize a round melting tank, those skilled in the art have continued to use a rectangular tank until my present invention. I have been able to solve the problem presented by the utilization of rectangular tanks and for the first time, have successfully solved it by employing a round tank and one in which side work holes may be utilized for withdrawing the melted glass. The illustrated embodiment of my invention is based upon its utilization as a so-called day tank, wherein a furnace may be charged with glass batch materials at the end of one day, the materials melted during the night with the work holes sealed, and the fully melted glass then withdrawn starting with the morning of the next day.

In solving the problem and in carrying out my invention, I discovered that a round melting-down tank should be employed, that the flame should be introduced into one end sector or segment of the tank and directed in a circular path therealong as a relatively low level blanket or flame stratum in immediate frictional engagement with the top surface of the melted glass, so as to impart a similar movement of melted glass about a centrally-positioned batch being melted down. I have been able to effect this type of movement and action by utilizing a single burner opening having a burner initially directing burning gases into the tank on a flow axis to one side of and substantially parallel to a horizontal diametric axis of the tank, and by utilizing a flue port or opening for burnt gases whose flow axis is substantially parallel to and on an opposite side of such diametric axis and that is located in the same wall segmental portion of the tank and on the same horizontal tank level as the burner opening. Both openings are located immediately above the flux block or molten glass level in the tank. The burning gases travel along the inside of the tank in a short-wasted U-shaped path, such that they flow in a circuitous path to circle around the inner periphery of bounding walls of the tank and about an outer periphery of a centrally positioned glass batch charge. The gases are substantially fully burnt when they reach the flue or stack connection opening that is located in the same sector or segmental back wall portion of the tank as the burner. The stack connection opening has a spaced relationship with respect to the burner (about a 50° segment between centers is shown) to avoid the possibility of portions of the flaming gases being short-circuited directly to the flue. It will be noted that the burner and flue openings are positioned in spaced-apart and parallel axial planes that define an angle of about 70° with respect to tangents of the circular walls of the tank.

Employing the principles of my invention, I have been able to use a round tank of, for example, about 2.41 tons per melt capacity which will have an even better melting characteristic than a smaller rectangular tank of 1.77 tons per melt capacity, assuming that substantially the same night melting-down time is available, see Table I. Even so, difficulty was encountered in melting glass in the smaller size rectangular tank to have it ready for working at seven o'clock in the morning; a larger tank tends to aggravate this condition still further. On the other hand, the larger capacity round tank of my invention melted its glass charge easily, quickly, and thoroughly within the time required and as contrasted to the rectangular tank, was always ready for work at 7 a. m. In fact, the time on this round tank of the above-mentioned capacity was about 8 to 10 hours as compared to an average time on the above rectangular tank of from 12 to 16 hours. This was true, although proportional gas burners utilizing an automatic air control, based on the amount of gas permitted to enter the furnace, were used in both instances. Although the fuel saving was considerable, I also found that a much better quality of glass was obtained in the round tank employing my invention. Normal defects, such as streaks, cords and stones were practically eliminated and devitrification during working periods was entirely eliminated.

In a tank constructed and employed in accordance with my invention, the cold glass batch is piled up towards its center above the normal working level of melted glass. The batch no longer acts as a dam in the direct path of the flame over which the flame flows, but causes the flame to flow along spacing between the batch and the inside walls of the tank. The chilling effect caused by the cold batch is not as great, since the burning gas makes substantially a complete circle and cooler gases have time to complete their combustion before they reach the stack outlet. As a result, inherent heat losses which are characteristic of a rectangular day tank are eliminated. There is no damming-up action of the melted glass, but on the other hand, the melted glass is moved in a continuously circulatory path about the batch being melted down, so that it aids in a uniform wearing-away and melting down of the batch charge. The melting down operation is thus about the outer boundary of the charge and is accomplished with a widening of the melted stream until the charge disappears by melting. Since the burning gases are directed in and follow a circuitous path, they are fully burnt before they escape into the stack. As a result, they escape without building-up back pressure and its accompanying evils. The uniform melting condition between the melting path and the batch cullet or charge entirely eliminates corners or pockets where the glass is isolated from higher temperature glass and cooled. The circuitous motion of the burning gases towards the stack insures the maintenance of a substantially uniform pressure within the tank and along its full inner periphery.

By adjustment of a damper in the stack, it is now possible to insure pressure uniformity within the tank that may be substantially the same as, and is preferably kept a few hundredths of an inch of water pressure higher than the outside atmosphere pressure during working periods. In this manner, outside cold air will be prevented from entering the tank through the work holes and the sting-out at one or more of the work holes is controlled. The glass, as melted, is in general, homogeneous and free from defects of the type above mentioned. The controlled lesser internal pressure during melting also tends to lengthen the life of the tank. Further, the uniform washing of the walls, because of the circulatory motion imparted to the molten glass at the bottom of the flame stratum, results in a longer life of the flux blocks, themselves. There are no appreciably hotter sections about the tank. For example, in a rectangular tank the burner end is always cooler than the stack end.

By finding a practical method of utilizing a round tank, I have been able to simplify the tank construction and reduce its cost. No buckstays and expansion bolts are necessary as it is free to expand on heating up without binding or cracking its blocks. That is, as the tank heats, the wall blocks automatically tend to make a larger diameter as they expand. There are no stay bolts to be loosened, except strap bolts. The useful life of a melting tank has been increased by 30% to 40% employing my invention.

In Figures 13 and 14, I have somewhat diagrammatically illustrated the novel method of melting down glass in accordance with my invention. In these figures, the batch charge to be melted is indicated as C and the melted glass as D. The full line arrows A indicate the path of movement of the burning combustion gases from the burner about the tank to the stack while the dot and dash arrows B indicate the corresponding stream movement of the melted glass D. In Figure 14, the depth extent of the flame strata is shown.

Referring particularly to Figures 1, 2, 3 and 4 of the drawings, I have illustrated a floor level A and a sub-floor level B on which the assembled parts of tank apparatus are positioned. The tank, itself, comprises refractory floor blocks 11 as an assembly with well-defining floor blocks 12. A tier of lower wall or flux blocks 13 is positioned about outer edges of the floor blocks 11 and with an upper tier of wall refractory blocks 14, define an enclosing wall for the tank. As shown particularly in Figures 2, 4, 16, 17 and 18, a pair of spaced-apart work-opening defining blocks 15 are assembled in the tiers of the blocks 13 and 14 to provide work hole openings 15a through which melted glass may be worked out or ladled out from a well 12a defined by the floor blocks 12.

A refractory burner block 16 (see Figures 1, 13, 14, 21 and 22) is positioned in an assembled relationship with the upper refractory tier 14 in a back sector or segment of the furnace. A flue opening is also defined in the same back sector or segment in a spaced-apart relationship with the burner block 16 by a pair of diagonally-positioned vertical-spacer block portions 17 (see Figures 1, 13, 14, 19 and 20), a horizontally-extending connecting-top block 18, and by the top portion of one of the flux blocks 13 of the lower tier of wall blocks.

Skew blocks 19 (see Figures 1, 2 and 14) rest upon the upper tier or refractory blocks 14 and support a cone-shaped roof arch or crown made up of refractory bricks or blocks 20. A center key block 21 is provided in the arch roof, as shown in Figure 14, to receive a suitable temperature reading instrument.

By way of example, the floor blocks 12 may have a thickness to provide about a 4 inch depth of well or sump and the flux blocks 13 have a height to provide about a 36 to 40 inch working level between the bottoms of the work hole blocks 15 and the shop floor A. The blocks are formed with a taper so that they interfit closely with each other. The roof blocks 20, for example may have a dimension of about 2½ by 4½ by 9 inches, tapered towards their bottom ends.

Figure 3:
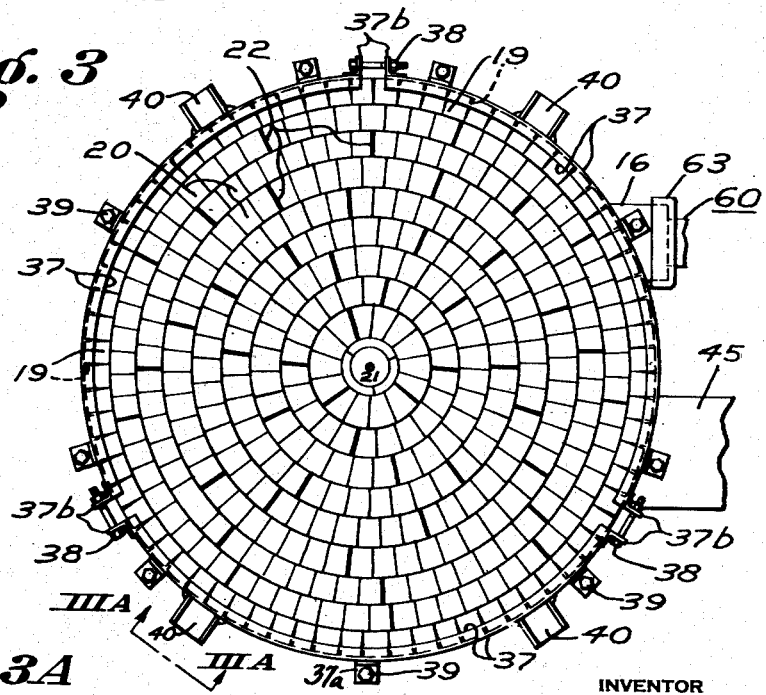
Figure 3 is a top plan view of the tank of Figure 2 showing its crown construction.

As shown particularly in Figures 1, 2 and 3, I have provided intermittently located cardboard spacers 22 between sets of roof blocks 20 in each of the roof tiers and such spacers have a staggered relationship in the various tiers taken radially of the roof. By way of example, a spacer 22 between each group of 7 to 10 blocks 20 in each tier has been found to be satisfactory. The roof blocks 20 and 21 are cemented in place, except where the spacers 22 are positioned. When the tank or furnace is heated up, the spacers 22 burn out and provide expansion joints for each tier. This provides a strong roof construction which automatically seals itself at its separated joints when it is heated up and prevents any damage to the roof blocks during both cooling and heating operations. The spacer joints also permit contraction of the roof tiers when the furnace is cooled down.

Referring particularly to Figures 1 and 2, the tank, as shown, is positioned on the sub-floor level B by a lower tier of spaced-apart cross I-beams 25, a second and upper tier of cross I-beams 26 which are at right angles to those of the lower tier and a layer of metal flats or strip members 27. The flat members 27 are laid at right angles to the upper tier of I-beams 26 to rest upon their upper flanges and support the refractory floor blocks 11 and 12. A metal cage 28 encloses the side walls of the tank and comprises, as shown particularly in Figures 1 and 2, a series of segmental clamping band assemblies 29, 30, and 31 which respectively encircle the bottom blocks 11, the flux blocks 13 and the refractory blocks 14. The cage 28 also has vertical pieces 32 which project downwardly from the lower band assembly 29, connecting pieces 33 which project between the lower band assembly 29 and the intermediate band assembly 30, and connecting pieces 34 which project between the metal band assembly 30 to the upper band assembly 31. The segmental parts of each band 29, 30 and 31 have end flanges which are secured together by adjustable bolt and nut assemblies 35 to form a complete encircling band assembly for the various tiers of blocks.

Figure 3A:
Figure 3A is a side section in elevation taken along the line IIIA—IIIA of Figure 3.

A channel-shaped side band assembly 37, also made up of segments, encircles the skew blocks 19. Flange ends 37b of its segments are adjustably connected together by bolt and nut sets 38. The upper band 31 is provided with a spaced series of angle pieces 31a (see Figure 2) which are in alignment with a similar spaced series of angle pieces 37a that are secured to the side band assembly 37. The angle pieces 31a and 37a define pairs that are adjustably tied together by threaded pin and nut pair assemblies 39. As shown particularly in Figures 3 and 3A, I have provided a set of four channel pieces 40 that are balanced in pairs or equally spaced in pairs, about the crown band assembly 37 and are welded to extend outwardly therefrom. The channel pieces 40 serve as supports for jacking up the crown or arch roof when the tank walls are to be repaired.

Referring particularly to Figures 1 and 4, I have illustrated the flue opening of the furnace or tank connected by a refractory connector or tunnel construction 45 to a flue stack 47. The connector construction 45 is supported on a metal framework 46 whose lower end portions are imbedded in or bolted to (shown in Figure 1) the floor A. The stack 47 which may be of brick construction, is positioned on a metal support structure 50 whose lower end portions are secured to the floor A in a similar manner. It will be noted that the tunnel or flue connector construction 45 slopes slightly downwardly from the tank to the opening in the stack construction 47. This prevents dirt from the stack and connections from entering the tank. It thus avoids a return to the molten glass in the tank of any discolored non-homogeneous glass that results from a melting down of dust particles and batch particles into a glass form in the stack connection. Such molten particles would cause streaks and discoloration in the working glass if permitted to return by gravity to the tank. I have also shown an opening 47a into a side of the stack 47, above the entrance of the connector construction 45 which may be used for cleaning-out purposes. Four metal angle pieces are positioned at four corners of the stack 47 and are connected by tie rods 49 to prevent movement of the stack.

Referring particularly to Figures 1, 4 and 9 to 12, inclusive, the top of the stack 47 is provided with a metal frame 51 secured thereover and having hinge ears 51a to pivotally receive a hinge pin 53. The pin 53 is loosely and removably mounted by cotters to extend transversely from ears 52a of a damper plate or member 52. The damper member 52 at its bifurcated end portion on which the ears 52a are mounted carries a counter-weight piece 54. As shown particularly in Figures 11 and 12, the counter-weight piece 54 is welded substantially centrally to the member 52 to extend backwardly therefrom, has an offset 54a to clear on the pivot pin 53, and has a counter-weight portion 54b. The portion 54b has a positioning and weight such that it somewhat balances the weight of the fore portion of the damper member 52 to make the damper easier to operate. The damper 52 may be operated by a pull chain (not shown) attached at 54c to the weight piece 54.

In Figure 1, I have also shown a chimney hood 55 having an outwardly or downwardly flared-out portion 55a which extends slightly below the upper end of the stack construction 47. This relationship permits air to enter through the bottom portion of the hood 55 and mix with furnace gases rising from the stack construction 47. In operation, the damper 52 will normally have a substantially fully open position, as indicated by the full lines of Figure 1, when a glass batch is being melted down, and a slightly open position, such as shown by the dot and dash lines of the same figure, when the glass has been melted down and only sufficient heat is being applied to maintain it in a molten condition.

In Figures 7 and 8, I have indicated how the bolt and nut assemblies of each of the band assemblies may be adjusted, by making specific reference or application to the upper band assembly 31. In Figure 7, the assembly 31 is shown loosened to provide a slight spacing s between the band assembly 31 and the wall blocks 14. When the furnace is heated up, the relationship is illustrated by Figure 8. That is, the expansion of the wall blocks takes up the spacing s and the blocks are permitted to expand radially-outwardly in a substantially uniform manner without damage.

In Table I, I have compared operating characteristics of a round tank constructed in accordance with my invention and numbered 11, as compared to a rectangular tank of conventional construction and numbered 15. These tanks, respectively, have tonnage capacities of 2.41 tons per melt (for No. 11) and 1.77 tons per melt (for No. 15).

Table I

|  | Round | Rectangular |
| --- | --- | --- |
| Tank No. | 11 | 15 |
| Days, Period of Test | 31.5 | 27.9 |
| No. of Melts | 21 | 19 |
| No. of Batches | 46.75 | 31.00 |
| Tons of Batch | 50.82 | 33.70 |
| Cu. Ft. Gas (8 oz.) Meter Reading | 1,453,822 | 1,326,173 |
| Cu. Ft. Gas (8 oz.) Per Ton of Batch | 28,488 | 39,252 |
| Difference Per Ton of Batch |  | +10,764 |
| Percent Less Gas Used | 27.32 |  |

The overall efficiency of my new tank construction is emphasized by the above table, particularly from the standpoint of its saving in gas consumption and the increased tonnage which can be handled per melt. However, the efficiency of the operation is further emphasized by the better and more homogeneous quality of the melt and the full elimination of defects, such as cords, etc. which were previously mentioned.

In Figures 1, 4, 13 and 15, I have shown a proportional burner construction having a housing 60, air and gas inlets 61 and 62, a mounting flange 63, and a burner head 64. The head 64 is provided with a series of air outlets 66 in its front face and a series of radially-outwardly extending and peripherally spaced-apart gas tube spokes 65. It will be noted that the gas enters the spokes 65 through inlets 65a and leaves through their inner or hub ends to define an annular area about the central axis of the head 64. This burner which is of standard construction is suitable for utilization with my furnace, since it produces an annular or cylindrically projected flame of no taper.

As shown in Figure 13, the flame is directed, so that it strikes the centrally-positioned charge C and is diverted outwardly towards the inside of the flux tier of the furnace to move in a circular path thereabout. This arrangement is highly effective since the flame is not pointed tangentially or directly towards the wall blocks, but on the other hand, is initially directed on a dissecting longitudinal plane towards an opposite wall segment of the tank. However, the flame is diverted during its movement so that it actually moves in an encircling path about the inside of the tank with a minimum of wear and tear on the wall blocks, with a maximum effectiveness of melting down action upon the cullet or batch C, and in such a manner that full combustion is accomplished before it enters the flue connector construction 45. The work holes in the blocks 15 may be closed off during the heating up operation and then opened during the holding cycle to permit molten glass to be removed from the wall 12a as needed.

What I claim is:

1. In an improved tank construction of the character shown and described for melting-down a glass batch charge wherein the tank has a refractory floor, upon a central portion of which the glass batch charge is to be positioned, a refractory wall projecting upwardly from said floor and defining a substantially circular melting chamber on the floor, said wall being circularly unobstructed about its interior portion, a relatively-low closed-off refractory roof crown arched from top portions of said refractory wall and defining an enclosed melting chamber therewith, a burner opening portion and a flue opening portion through a back segment of said wall on substantially the same horizontal plane and in a circumferentially spaced-apart relationship with each other, said burner portion having a flow axis that is substantially parallel to a flow axis of said flue portion, said flow axes being curvilinear and lying on opposite sides of an axis from the back segment to a front segment of said wall and which axis extends substantially centrally between said flow axes, said burner and flue opening portions being positioned above a normal working level of melted glass within the tank and adjacent said roof crown, at least one side work hole portion for the glass through said wall and positioned above the normal working level of melted glass within the tank, and said burner opening portion being positioned to direct a melting flame substantially circularly about the central portion of said floor and the glass charge thereon and out of said flue opening portion to melt the glass charge and sweep melted glass substantially circularly about the central portion of said floor.

2. In an improved day tank construction of the character shown and described for melting-down a glass batch charge wherein the tank has a refractory floor upon a center portion of which the glass batch charge is positioned, a refractory wall projecting upwardly from said floor and defining a substantially circular melting chamber on the floor, said wall being circularly unobstructed about its interior portion, a relatively-low closed-off refractory roof crown arched from top portions of said refractory wall and defining an enclosed melting chamber therewith, a burner opening portion and a flue opening portion through a back segment of said wall on substantially the same horizontal plane and in a circumferentially spaced-apart relationship with each other, said burner portion having a flow axis that is substantially parallel to a flow axis of said flue portion, said flow axes lying on opposite sides of a central diametric axis from the back segment to a front segment of said wall, said burner and flue opening portions being positioned above the normal working level of melted glass within the tank and adjacent said roof crown, at least one work hole portion in a side segment of said wall that is between the front segment thereof and said flue opening portion and positioned above the normal working level of melted glass within the tank for introducing a batch charge into and for removing melted glass from the tank, and a burner connected to said burner opening portion and with said unobstructed interior portion of said side wall directing a melting flame substantially circularly about the central portion of said floor and the glass charge thereon and out of said flue opening portion to melt the glass charge and sweep melted glass in the same direction aobut the central portion of said floor.

3. An improved day tank construction as defined in claim 2 wherein, a pair of work hole portions are provided in the defined side segment of said wall and of the defined positioning in a circumferentially spaced-apart relationship with each other, and said refractory floor has a depressed ladle well portion therein adjacent the defined side segment and said pair of work hole portions to facilitate a ladling out of melted glass from the tank through said work hole portions.

4. An improved day tank construction of the character shown and described for melting down a glass batch charge wherein the tank has a refractory floor upon a central portion of which the batch charge is positioned, a refractory wall projecting upwardly from said floor and defining a substantially circular melting chamber on the floor, said wall being circularly unobstructed about its interior portion, a relatively-low closed-off refractory roof crown arched from top portions of said refractory wall and defining an enclosing melting chamber therewith, a burner opening portion and a flue opening portion through a back segment of said wall on substantially the same horizontal plane and in a circumferentially spaced-apart relationship with each other, said burner portion having a flow axis that is substantially parallel to a flow axis of said flue portion, inward projections of said flow axes lying along opposite side portions of the central portion of said floor upon which the batch charge is positioned, said burner and flue opening portions being positioned above the normal level of melted glass within the tank and adjacent said roof crown, a pair of work hole portions in a side segment of said wall in a circumferentially spaced-apart relationship with respect to each other and on substantially the same horizontal plane for directly introducing a batch charge into and removing melted glass from the tank, said work hole portions being normally closed during the melting down of the batch charge, and a burner connected to said burner opening portion and with said unobstructed interior portions of said wall and said roof crown for directing a melting flame substantially circularly about the central portion of the floor and the glass charge thereon and out of said flue opening portion to melt the glass charge and sweep melted glass in the same direction about the central portion of the floor.

5. An improved day tank construction as defined in claim 4 wherein, a damper-controlled stack is provided and a refractory tunnel is connected between said flue opening portion and said stack, and said tunnel extends downwardly-outwardly from said flue opening portion to discharge burnt gases from the tank and prevent dirt from said stack from entering the tank.

6. An improved day tank construction as defined in claim 4 wherein, said burner has means to project a substantially circular non-tapered flame into and circularly about the central portion of said floor, and said floor has a ladle well portion therein adjacent the defined side segment of said wall and adjacent said pair of work hole portions to facilitate a ladling out of melted glass from the tank through said work hole portions.

References Cited in the file of this patent

UNITED STATES PATENTS

| Number | Name | Date |
|---|---|---|
| 230,668 | Siemens | Aug. 3, 1880 |
| 270,594 | Leuffgen | Jan. 16, 1883 |
| 908,151 | Schwenzfeier | Dec. 29, 1908 |
| 1,032,177 | Baillie | July 9, 1912 |
| 2,263,848 | Keaney | Nov. 25, 1941 |

FOREIGN PATENTS

| Number | Country | Date |
|---|---|---|
| 753,472 | France | Aug. 7, 1933 |